United States Patent
Mohs et al.

(10) Patent No.: US 10,053,617 B2
(45) Date of Patent: Aug. 21, 2018

(54) METHOD OF CHEMICALLY INCREASING THE EFFICIENCY OF PEROXYGEN BASED VISCOSITY REDUCTION REACTIONS

(71) Applicant: Orin Technologies, LLC, Verona, WI (US)

(72) Inventors: Adam Mohs, Sartell, MN (US); Marc Baures, Ettrick, WI (US); Larry Kinsman, Verona, WI (US)

(73) Assignee: ORIN TECHNOLOGIES, LLC, Verona, WI (US)

( * ) Notice: Subject to any disclaimer, the term of this patent is extended or adjusted under 35 U.S.C. 154(b) by 0 days.

(21) Appl. No.: 15/301,302

(22) PCT Filed: Apr. 3, 2015

(86) PCT No.: PCT/US2015/024193
§ 371 (c)(1),
(2) Date: Sep. 30, 2016

(87) PCT Pub. No.: WO2015/153937
PCT Pub. Date: Oct. 8, 2015

(65) Prior Publication Data
US 2017/0022409 A1 Jan. 26, 2017

Related U.S. Application Data

(60) Provisional application No. 62/128,612, filed on Mar. 5, 2015, provisional application No. 61/974,551, filed on Apr. 3, 2014.

(51) Int. Cl.
| | | |
|---|---|---|
| *E21B 43/267* | (2006.01) | |
| *C09K 8/62* | (2006.01) | |
| *E21B 21/06* | (2006.01) | |
| *C09K 8/80* | (2006.01) | |
| *E21B 43/26* | (2006.01) | |

(52) U.S. Cl.
CPC ............... *C09K 8/62* (2013.01); *C09K 8/80* (2013.01); *E21B 21/062* (2013.01); *E21B 43/26* (2013.01); *E21B 43/267* (2013.01); *C09K 2208/26* (2013.01)

(58) Field of Classification Search
CPC ........ C09K 8/62; C09K 8/80; C09K 2208/26; E21B 21/062; E21B 43/26; E21B 43/267
USPC .................................................. 166/280.1
See application file for complete search history.

(56) References Cited

U.S. PATENT DOCUMENTS

| | | | |
|---|---|---|---|
| 8,567,499 B2 * | 10/2013 | Li | C09K 8/32 166/276 |
| 8,575,073 B2 * | 11/2013 | Ali | C09K 8/68 166/305.1 |
| 8,584,757 B2 | 11/2013 | Reyes | |
| 8,720,569 B2 | 5/2014 | Loveless et al. | |

(Continued)

*Primary Examiner* — Silvana C Runyan
(74) *Attorney, Agent, or Firm* — Boyle Fredrickson, S.C.

(57) ABSTRACT

A method of reducing the viscosity of a viscosified fluid in an underground drilling operation comprising, where the introduction of a chelated transition metal catalyzes the viscosity reduction of the viscosified fluid. The chelated transition metal may be ferric methylglycinediacetate. Additionally, an uninhibited oxidizing agent, such as a peroxygen compound, may also be present in combination with the chelated transition metal to catalyze the viscosity reduction of the viscosified fluid.

13 Claims, 6 Drawing Sheets

(56) References Cited

U.S. PATENT DOCUMENTS

| | | | |
|---|---|---|---|
| 2008/0173452 A1* | 7/2008 | Sanders | C09K 8/524 166/308.2 |
| 2011/0259592 A1 | 10/2011 | Reyes | |
| 2013/0168095 A1 | 7/2013 | Loveless et al. | |
| 2013/0213657 A1* | 8/2013 | Dobson, Jr. | C09K 8/24 166/308.5 |

* cited by examiner

METHOD OF CHEMICALLY INCREASING THE EFFICIENCY OF PEROXYGEN BASED VISCOSITY REDUCTION REACTIONS

CROSS-REFERENCE TO RELATED APPLICATIONS

This application is a 371 U.S. National Phase Entry of PCT/2015/024193, international filing date Apr. 3, 2015, which claims priority to U.S. Provisional Patent Application Ser. No. 61/974,551, filed Apr. 3, 2014, and U.S. Provisional Patent Application Ser. No. 62/128,612, filed Mar. 5, 2015, the contents of which are incorporated by reference in their entireties.

BACKGROUND OF THE INVENTION

1. Technical Field

The present invention relates to a method of reducing the viscosity and molecular weight of a viscosified fluids and other polymer containing fluids used in subsurface hydraulic fracturing and stimulation operations, and more specifically relates to a method of reducing the viscosity and molecular weight of a viscosified fluids and other polymer containing fluids used in subsurface hydraulic fracturing and stimulation operations through the administration of a chelated transition metal.

2. Background Art

Hydraulic fracturing is a well-stimulation technique in which subsurface rock formations are fractured by the introduction of a hydraulically pressurized liquid. As a result of the cracks or fractures that are formed in rock formations, natural gas and/or petroleum flow and extraction from a well may be increased. Additional solid material additive components, commonly referred to as hydraulic fracturing proppants, may also be added to the hydraulic fracturing fluid to hold the fractures open.

Various form of hydraulically pressurized liquid are currently used, including viscosified fluids such as slick water, linear gels and cross-linked gels. While such viscous fluids are capable of carrying more concentrated proppant into subsurface rock formations, these viscofied fluids do present various drawbacks. One shortcoming regarding the use of viscosified fluids for stimulation and fracturing applications is the difficulty in effectively removing or extracting the viscofied fluid from the formation without removing the proppant from the fractures. Prior attempts to remove the viscosified hydraulic fracturing fluids have included the introduction of chemicals to reduce the viscosity of the fracturing fluids, commonly known as breakers. Examples of such break systems include the use of oxidative chemistries in various forms, as well as other methods that utilize chelants, surfactants, etc. However, many of these oxidative breaker systems do not achieve the desired degree of reduction in fluid viscosity and/or the desired degree of reduction in polymer molecular weight. Additionally, many of these prior oxidative breaker systems cannot perform the desired reduction in fluid viscosity and/or the desired reduction in polymer molecular weight in a delayed manner.

In order to increase the efficiency of oxidants used for reducing the viscosity of viscosified fluids, various catalytic agents have been employed for the purposes of decreasing reaction time and free radical generation.

The process of chelating transition metals has been shown to reduce the required concentration of transition metals, which in turn keeps certain transition metals in solution during their use as catalytic agents or redox agents which interact chemically with any number of bonds or linkages. Traditional chelating agents such as Sodium EDTA produces very stable, and therefore catalytically unavailable, complexes with transition metals. For example, the logarithmic stability constants, identified as log K in Table 1 below, for complexes of the chelating agent EDTA and certain transition metal complexes can be seen below in Table 1.

TABLE 1

| Metal ion | log K |
|---|---|
| Co3+ | 41 |
| Fe3+ | 25.1 |
| Hg2+ | 21.8 |
| Cu2+ | 18.8 |
| Ni2+ | 18.6 |
| Pb2+ | 18 |
| Cd2+ | 16.5 |
| Zn2+ | 16.5 |
| Co2+ | 16.3 |
| Al3+ | 16.1 |
| Fe2+ | 14.3 |
| Mn2+ | 13.8 |
| Ca2+ | 10.6 |
| Mg2+ | 8.7 |
| Ba2+ | 7.9 |
| Ag+ | 7.3 |

Despite these advancements and use of EDTA chelated transition metals as catalyzing agents in drilling related applications, it is still desirable to overcome present shortcomings to more efficiently reduce the viscosity of viscosified hydraulic fluids and/or reduce the molecular weight of the water soluble polymers within such fluids to desired levels.

Additionally, iron containing compounds have been shown to be effective catalysts in promoting oxidation-reduction (redox) reactions. In the classic Fenton reaction, identified below as Equation 1, a ferrous ion, Fe(II), rapidly reduces hydrogen peroxide to primarily hydroxyl radicals, which can react with and degrade a target contaminant. The reaction involves hydrogen peroxide and a ferrous iron catalyst. The peroxide is broken down into a hydroxide ion and a hydroxyl free radical. The hydroxyl free radical is the primary oxidizing species and can be used to oxidize and break apart organic molecules.

$$H_2O_2 + Fe^{2+} \rightarrow Fe^{3+} + HO^- + HO^* \qquad \text{(Equation 1)}$$

In the classic Fenton reaction, a ferrous ion, Fe(II), is required in stoichiometric amounts. Peroxide demand, and therefore, ferrous ion demand can be high due to the required viscosity reduction. Ferrous ions also can be oxidized by the hydroxyl radicals, and therefore can compete with the target compounds unless its concentration is kept low by gradual addition in dilute form which may require undesirable or costly encapsulation in breaking applications. Accordingly, a method for introducing iron ions without substantial dilution or encapsulation is needed.

Ferric ion, Fe(III) can also produce hydroxyl radicals from peroxide, albeit at a slower rate than ferrous ion, Fe(II). The use of ferric ions, however, typically requires acidic conditions to keep the iron soluble, therefore, the classic Fenton reaction has an optimum pH of about 3. Such acidification, i.e., a low pH level, can cause undesirable issues with the performance of certain viscosifying agents and other fracturing fluid additives. Accordingly, a method for introducing ferric ions in a less acidic or non acidic environment is needed.

SUMMARY OF THE INVENTION

The inventors have discovered that ferric MGDA is an efficient catalyst and redox promoting agent over a wide pH range when compared to transition metals, transition metal salts, and other chelating agent/transition metal complexes.

In one embodiment, the present invention provides a method of catalyzing peroxygen based viscosity and/or molecular weight reduction reactions of viscosified fluids, for example, hydraulic fracturing fluids A viscosity breaker system used to reduce the viscosity and molecular weight of viscosity increasing polymers to desired viscosity values and molecular weight distributions is presented.

In one aspect of the invention, the viscosity breaker system comprises a highly efficient catalyzing and redox initiating agent, specifically, ferric methylglycine diacetate (ferric MGDA).

As such, one embodiment the present invention includes a method of reducing the viscosity of a viscosified fluid in an underground drilling operation comprising the steps of: combining an uninhibited viscosified fluid with a chelated transition metal to form a mixture; introducing the mixture through a well into an underground formation at high pressure to fracture the underground formation; after fracturing the underground formation, the chelated transition metal catalyzing a conversion of a volume of the viscosified fluid in the mixture to a reduced viscosity fluid having a viscosity lower than the viscosified fluid; and extracting the reduced viscosity fluid from the well.

In another aspect of the invention, the viscosity breaker system comprises a per oxygen compound such as peroxides, persulfate salts, percarbonate salts, etc. or combination thereof and a highly efficient peroxygen catalyzing agent, specifically, ferric methylglycine diacetate (ferric MGDA).

As such, one embodiment the present invention includes a method of reducing the viscosity of a viscosified fluid in an underground drilling operation comprising the steps of: combining an uninhibited viscosified fluid with a ferric methylglycinediacetate and an uninhibited oxidizing agent to form a mixture; introducing the mixture through a well into a subsurface; after introducing the mixture into the subsurface, the ferric methylglycinediacetate and the uninhibited oxidizing agent catalyzing a conversion of a volume of the viscosified fluid in the mixture to a reduced viscosity fluid having a viscosity lower than the viscosified fluid; and extracting the reduced viscosity fluid from the well.

Another embodiment the present invention includes a method of reducing the viscosity of a viscosified fluid in an underground hydraulic fracturing operation comprising the steps of: combining a viscosified fluid, a proppant material, ferric methylglycinediacetate, and uninhibited hydrogen peroxide to form a mixture; introducing the mixture through a well into an underground formation at high pressure to fracture the underground formation; introducing the proppant material into the underground formation after the underground formation has fractured; after fracturing the underground formation, the ferric methylglycinediacetate and the uninhibited hydrogen peroxide catalyzing a conversion of a volume of the viscosified fluid in the mixture to a reduced viscosity fluid having a viscosity lower than the viscosified fluid; and extracting the reduced viscosity fluid from the well while the proppant material remains in the underground formation.

In one embodiment, method of present invention results in a reduced viscosity fluid that has a viscosity approximately equal that of water.

In another embodiment, the method of the present invention also includes the step of reducing the molecular weight of one or more polymers contained in the viscosified fluid.

In one embodiment, the chelated transition metal of the present invention is a solution having a pH of between 4.0 and 6.0.

In another embodiment, the chelated ferric ion of the present invention has a logarithmic stability constant value of between 20.0 and 15.0.

Further aspects or embodiments of the present invention will become apparent from the ensuing description which is given by way of example only.

DETAILED DESCRIPTION

Referring generally to FIGS. 1 through 5, and the various embodiments of the present invention described in further detail below, the present invention is directed to a method of catalyzing the breaking a viscosified fluid, i.e. reducing viscosity and/or reducing the molecular weight of polymers within the viscosified fluid, through the use of a ferric methylglycinediacetate (Fe-MGDA). The inventors have discovered that Fe-MGDA is more efficient catalyst and redox promoting agent over a wide pH range when compared to transition metals, transition metal salts, and other chelating agent/transition metal complexes for breaking viscosified fluids used in oil and gas drilling applications.

Additionally, the logarithmic stability constants for MGDA, which are shown in Table 2, indicate that the stability constant, identified as "log K," of complexes formed with chelating agent MGDA are markedly lower relative to the stability constants for complexes of EDTA listed previously in Table 1. The relatively lower stability constants for MGDA is indicative of a more catalytically available transition metal complex. Accordingly, MGDA demonstrates an increase activity toward catalyzing and/or promotion of redox reactions in viscosified fluids, which results in relatively quicker viscosity reductions.

TABLE 2

| Metal ion | log K |
|---|---|
| $Fe^{3+}$ | 16.5 |
| $Cu^{2+}$ | 13.9 |
| $Pb^{2+}$ | 12.1 |
| $Ni^{2+}$ | 12 |
| $Co^{2+}$ | 11.1 |
| $Zn^{2+}$ | 10.9 |
| $Cd^{2+}$ | 10.6 |
| $Fe^{2+}$ | 8.1 |
| $Mn^{2+}$ | 8.4 |
| $Ca^{2+}$ | 7 |
| $Mg^{2+}$ | 5.8 |
| $Sr^{2+}$ | 5.2 |
| $Ba^{2+}$ | 4.9 |

As used herein, the term "ferric chelate" means any one of a number of organic and inorganic polydentate ligands complexed with ferric ion, Fe(III). An "active" ferric chelate is one that exhibits activity toward catalyzation and/or promotion of redox reactions with the viscosifying agent to be degraded. An "active" ferric chelate may also be one that exhibits activity toward oxidation of the viscosifying agent to be degraded, i.e., is capable of generating free radicals or other reactive oxidants from an oxidant (also referred to as an "oxidizing agent" herein), such as a peroxide or a persulfate in the presence of a viscosified fracturing fluid. The chemical reactions that are facilitated by the ferric chelate and result in the changes to chemical bonds that reduce viscosity of the viscosified fluid may include, but are not limited to electron addition, electron removal, hydrogenation, and dehydrogenation.

Viscosified fluids may consist of any high viscosity solution such as slick water, gel frac, friction reducer, etc. Such viscosified fluids, as are considered within the scope of this invention may be prepared by adding a quantity of a viscosifier such as polymer, polyacrylamides (PAM), PAM co-polymers, xanthan gum, guar gum, or other viscosifiers to a given amount of water or other liquid dilutent. This water dilutent can be fresh water or a brine solution made from any number of salts such as sodium chloride, calcium chloride, potassium chloride, seawater, produced water or others.

Some embodiments of the present invention are based, at least in part, on the unexpected discovery that a particular novel active ferric chelate, Fe-MGDA, unpredictably demonstrates a significant ability to reduce the viscosity of fluids viscosified with various viscosifying polymers, and particularly more so than other chelated transition metals.

Therefore, one embodiment of the present invention, described in detail below as method 100, is directed towards reducing the viscosity of a viscosified fracture fluid associated with the stimulation of tight formations in oil and gas production, comprising treating the viscosified fluid with Fe-MDGA in amounts effective to reduce the viscosity and/or molecular weight to a desired level.

Further embodiments of the present invention are based, at least in part, on the discovery that a particular novel active ferric chelate, Fe-MGDA, combined with selected oxidizing agents unpredictably demonstrate a significant activity at oxidizing viscosifying agents in fracturing fluid and beyond the activity which would be expected in the presence of the selected oxidizing agent alone.

As it relates to the oxidant component of this embodiment, as shown below in Table 3, hydrogen peroxide is a relatively powerful oxidant. Also shown in Table 3 is the much more powerful hydroxyl radical, a type of free radical, which is second in the list only to fluorine in its oxidation potential.

TABLE 3

| Oxidant | Oxidation Potential, V |
|---|---|
| Fluorine | 3 |
| Hydroxyl radical | 2.8 |
| Ozone | 2.1 |
| Hydrogen peroxide | 1.8 |
| Potassium permanganate | 1.7 |
| Chlorine dioxide | 1.5 |
| Chlorine | 1.4 |

Therefore, another embodiment of the present invention, described in detail below as method 200, is directed towards reducing the viscosity of a viscosified fracture fluid associated with the stimulation of tight formations in oil and gas production, comprising treating the viscosified fluid with Fe-MDGA and an oxidizing agent in amounts effective to reduce the viscosity and/or molecular weight to a desired level.

First Embodiment

Figure 1:
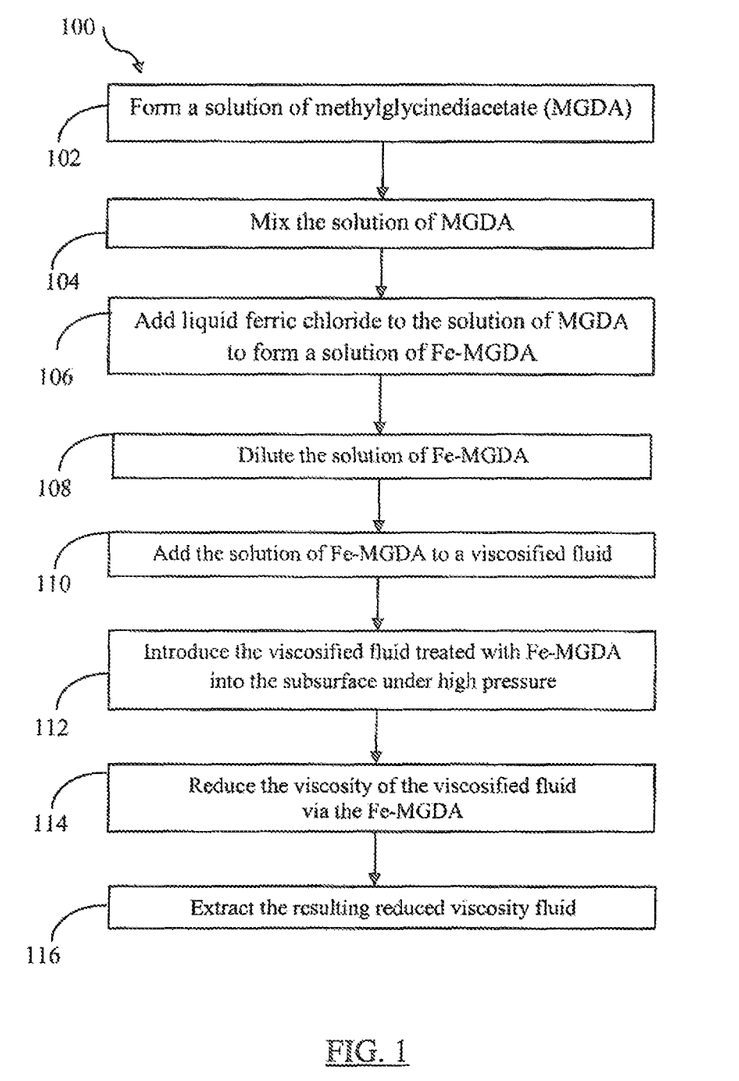
FIG. 1 is a flow chart showing the steps of a method of breaking a viscosified fluid according to one embodiment of the present invention.

Referring first to FIG. 1, a method 100 is shown for reducing the viscosity of a viscosified fluid, in accordance with a first embodiment of the present invention. For example, the viscofied fluid may be a viscosified fluid such as slick water, linear gels, or cross-linked gels, which are commonly used in drilling operations such as hydraulic fracturing; however, other oil or gas drilling related operations are considered well within the scope of this invention.

The first step of the method 100 is to combine a volume of a chelating agent methylglycinediacetate (MGDA), e.g. trisodium methylglycinediacetate, with a volume of water to form a diluted solution of MGDA, shown at block 102. MGDA may be purchased from BASF Corp, of Mount Olive, N.J., under their product name, Trilon M at a 39% concentrated liquid having a density of 1.29-1.33 g/cm3, a pH of about 10.0 to about 12.0, and a molecular weight of MGDA-Na3: 271. In one embodiment of the method 100, 52.3 mL of MGDA, or approximately 27 g of Trilon M was combined with approximately 800 mL of water, with the resultant diluted solution of MGDA having a pH of preferably between 10.0 and 12.0.

The diluted solution of MGDA is then mixed at block 104, such as with a mechanical stir bar or alternative mechanical agitation techniques. At subsequent block 106, liquid ferric chloride is added to the diluted solution of MGDA. In one embodiment of the method 100, ferric chloride is added to the diluted solution of MGDA until the resultant solution has a pH of preferably between 4.0 and 8.0, and more preferably a pH of 5.0.

At block 108, additional water may be added to the Fe-MGDA solution until the final fluid volume of the solution is 1000 mL. However, it should be understood that various volumes of solutions used in method 100 are considered within the scope of this invention, and the volumes identified above are provided by of example, not to be consisted exclusive of exhaustive thereof.

At block 110, the Fe-MGDA solution is added to a viscosified fluid that is to be used in an oil or gas drilling related operation, i.e. hydraulic fracturing fluid. In one embodiment, the Fe-MGDA solution is added directly to the viscosified fluid, which may or may not contain proppants after viscosifier hydration. Metering pumps may alternatively be used in order to achieve specific concentrations of the Fe-MGDA solution in the viscosified fluids as they are being injected into the subsurface. Alternatively, the Fe-MGDA solution can be poured or transferred directly into containers of viscosified fluid such as frac tanks, storage tanks, hydration mixers, etc. Mixing may be achieved by any number of static or mechanical mixing techniques.

At block 112, the viscosified fluid, including the Fe-MGDA solution and possible proppants is then injected into the subsurface. In one embodiment of the method 100, where the viscosified fluid is a hydraulic fracturing fluid, injection of the fluid at block 112 may result in the hydraulic fracturing of the subsurface or underground formation in order to stimulate the release of any number of fluids or gasses form the subsurface formation.

At subsequent block 114, the Fe-MGDA solution reduces the viscosity of the viscosified fluid, and reduces the molecular weight of viscosity increasing polymers contained within the viscosified fluid. After the Fe-MGDA solution has reduced the viscosity of the viscosified fluid through catalyzing redox reactions therein and possibly alternative chemical interactions, i.e., converted the viscosified fluid to a reduced viscosity fluid, the reduced viscosity fluid is extracted from the well, at block 116.

Second Embodiment

Figure 2:
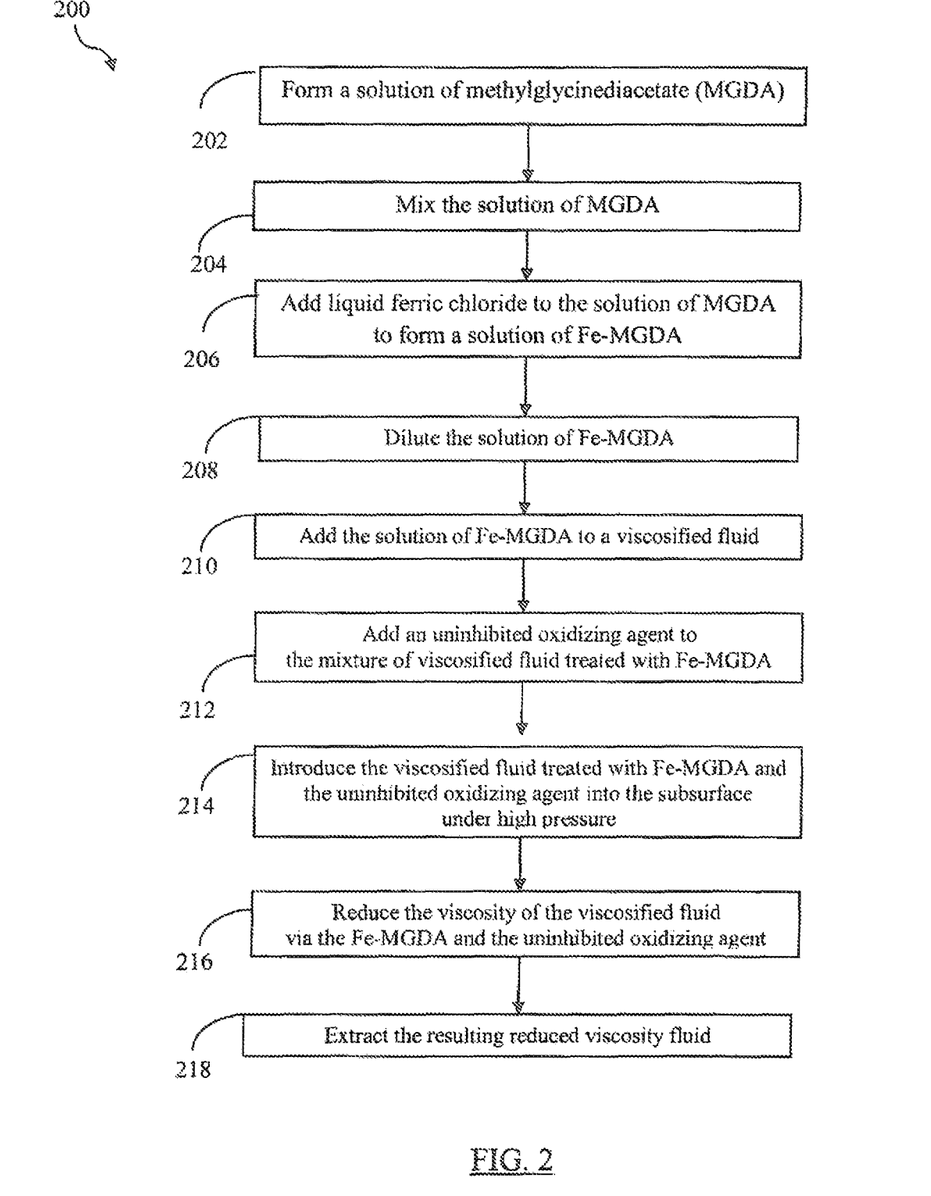
FIG. 2 is a flow chart showing the steps of an alternative method of breaking a viscosified fluid according to one embodiment of the present invention.

Referring first to FIG. 2, a method 200 is shown for reducing the viscosity of a viscosified fluid, in accordance with a second embodiment of the present invention. As in the prior embodiment of method 100, the viscofied fluid of method 200 may employ a viscosified fluid such as slick water, linear gels, or cross-linked gels, which are commonly used in drilling operations such as hydraulic fracturing; however, other oil or gas drilling related operations are considered well within the scope of this invention. The viscosified fluid on method 200 may be prepared by adding a quantify of a viscosifier such as polyacrylamide, xanthan gum, guar gum, or other viscosifiers to a given amount of water. This water dilutent can be fresh water or a brine solution made from any number of salts such as sodium chloride, calcium chloride, potassium chloride, seawater, produced water or others.

The first step of the method 200 is to combine a volume of a chelating agent methylglycinediacetate (MGDA), e.g. trisodium methylglycinediacetate, with a volume of water to form a diluted solution of MGDA, shown at block 202. In one embodiment of the method 200, in which a final volume of 1 L of the FE-MGDA was produced, 52.3 mL of MGDA, or approximately 27 g of Triton M, was combined with approximately 800 mL of water, with the resultant diluted solution of MGDA having a pH of preferably between 10.0 and 12.0.

The diluted solution of MGDA is then mixed at block 204, such as with a mechanical stir bar or alternative mechanical agitation techniques. At subsequent block 206, liquid ferric chloride is added to the diluted solution of MGDA. In one embodiment of the method 200, ferric chloride is added to the diluted solution of MGDA until the resultant solution has a pH of preferably between 4.0 and 8.0, and more preferably a pH of 5.0.

At block 208, additional water may be added to the Fe-MGDA solution until the final fluid volume of the solution is 1000 mL. However, it should be understood that various volumes of solutions described in method 200 are considered within the scope of this invention, and the volumes identified above are provided by of example, not to be consisted exclusive of exhaustive thereof.

At block 210, the Fe-MGDA solution is added to an uninhibited viscosified fluid that is to be used in an oil or gas drilling related operation. In one embodiment, the Fe-MGDA solution is added directly to the viscosified fluid, which may or may not contain proppants after viscosifier hydration. Metering pumps may alternatively be used in order to achieve specific concentrations of the Fe-MGDA solution in the viscosified fluids as they are being injected into the subsurface. Alternatively, the Fe-MGDA solution can be poured or transferred directly into containers of viscosified fluid such as frac tanks, storage tanks, hydration mixers, etc. Mixing may be achieved by any number of static or mechanical mixing techniques.

At block 212, an uninhibited oxidizing agent is then added to the mixture of viscosified fluid and Fe-MGDA. The uninhibited oxidizing agents added at block 212 may be a peroxygen compound selected from a group including hydrogen peroxide, calcium peroxide, and/or magnesium peroxide, a persulphate, such as, but not limited to sodium persulphate, potassium persulphate, and/or ammonium persulphate, etc., ozone; a permanganate, such as but not limited to sodium permanganate, potassium permanganate, etc., chlorine dioxide, a halogen, such as but not limited to chlorine, bromine, iodine, fluorine, etc., and combinations thereof. The uninhibited oxidizing agent may be either added in dry form, or alternatively dissolved in water. As with the prior components, the oxidizing agent may be introduced via metering pumps as to achieve specific concentrations of the oxidizing agent in the resultant solution. Alternatively, the Fe-oxidizing agent can be poured or transferred directly into containers of viscosified fluid such as frac tanks, storage tanks, hydration mixers, etc. Mixing may be achieved by any number of static or mechanical mixing techniques. Additionally, variations in the order of chemical additions or methods of mixing are considered within the scope of the present invention.

At block 214, the viscosified fluid, including the uninhibited oxidizing agent and the Fe-MGDA solution, as well as optional proppants is then injected into the subsurface. In one embodiment of the method 100, where the viscosified fluid is a hydraulic fracturing fluid, injection of the fluid at block 112 may result in the hydraulic fracturing of the subsurface formation in order to stimulate the release of any number of fluids or gasses form the subsurface formation.

At subsequent block 216, the uninhibited oxidizing agent and the Fe-MGDA solution reduces the viscosity of the viscosified fluid, and reduces the molecular weight of viscosity increasing polymers contained within the viscosified fluid. After the uninhibited oxidizing agent and the Fe-MGDA solution have reduced the viscosity of the viscosified fluid through redox reactions and/or other chemical reactions, i.e., converted the viscosified fluid to a reduced viscosity fluid, the reduced viscosity fluid is extracted, at block 218.

Turning now to FIGS. 3 through 6, various embodiments of the present invention are described below. In the following examples, fluid viscosities were tested using a Marsh funnel. All result flow times shown FIGS. 3 through 6 were normalized using tap water as a basis. The time for water to pass through the funnel was normalized to a value of 1, depicted along the y-axis of plots 300 and 400. Initial time for the viscosified fluid was normalized using the same scale, depicted along the x-axis of plots 300 and 400. Temperatures were held constant throughout the test period. The viscosifying agents used were a polyacrylamide, guar, and a polyacrylamide (PAM). A 0.5% by volume viscosifying agent solution was made using a 6% by weight NaCl brine solution or tap water as the dilutent.

Example 1

Figure 3:
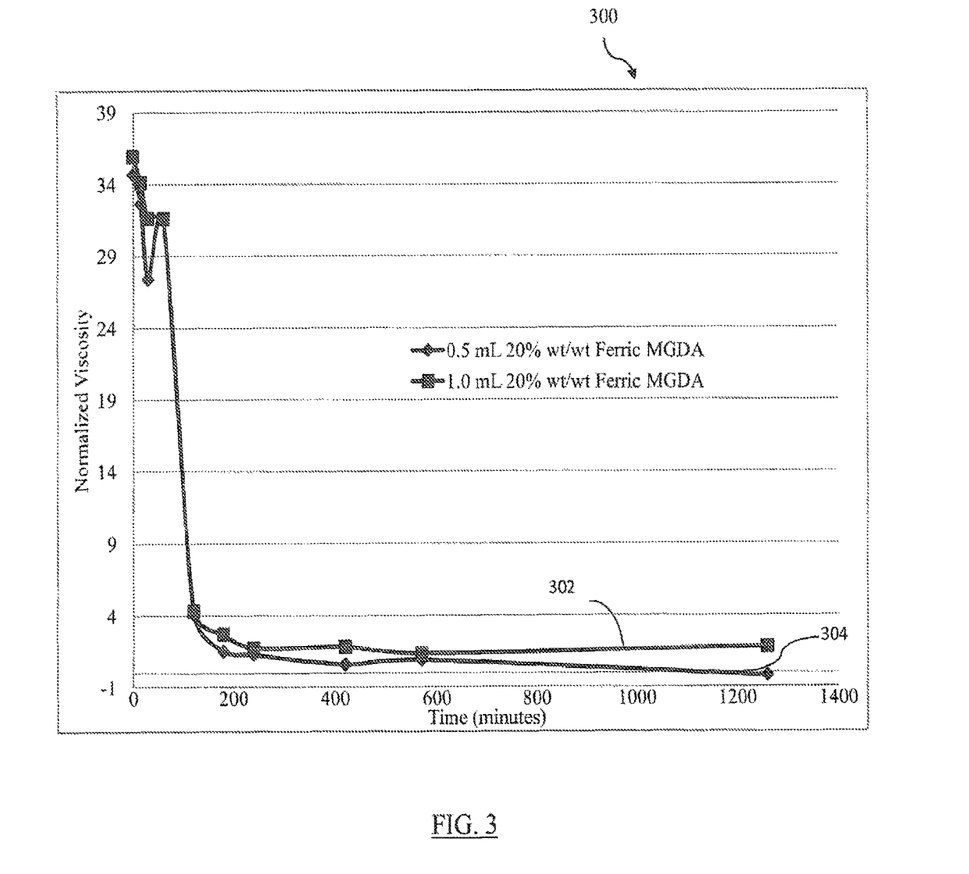
FIG. 3 is a plot showing the relative normalized fluid viscosities over time of two polyacrylamide viscosified fluid solution samples, where the two samples include different volumes of ferric MGDA.

Turning now FIG. 3, plot 300 shows the relative normalized fluid viscosities over time of two polyacrylamide viscosified fluid solution samples, where the two samples include different volumes of a ferric MGDA (Fe-MGDA).

In this example, two 500 mL viscosified fluid samples composed of 0.5% by volume polyacrylamide solution were made using tap water. One sample received a 0.5 mL dose of 20% by weight ferric MGDA (Fe-MGDA) solution. The second sample received a 1.0 mL dose of 20% by weight ferric MGDA (Fe-MGDA) solution. With the both samples the ferric MGDA solution was added to the viscosified fluid and mixed thoroughly.

As can be seen in trend line 302 on plot 300, the viscosity of the viscosified fluid is reduced to the same approximate viscosity was tap water, a normalized viscosity of 1.0, when 1.0 mL of the catalyzing and redox initiating agent ferric MGDA is added to the viscosified fluid. Similarly, trend line 304 shows that the viscosity of the viscosified fluid is also reduced to the same approximate viscosity was tap water, i.e., a normalized viscosity of 1.0, when 0.5 mL of the catalyzing and redox initiating agent ferric MGDA is added to the viscosified fluid. Both samples, identified by trend lines 302 and 304 achieved this reduced viscosity in a comparable time period of approximately 200 minutes. Accordingly, plot 300 demonstrates the ability of a catalyzing and redox initiating agent according to the present invention to initiate a viscosity reduction in a polyacrylamide solution in the absence of an oxidizing agent.

Example 2

Figure 4:
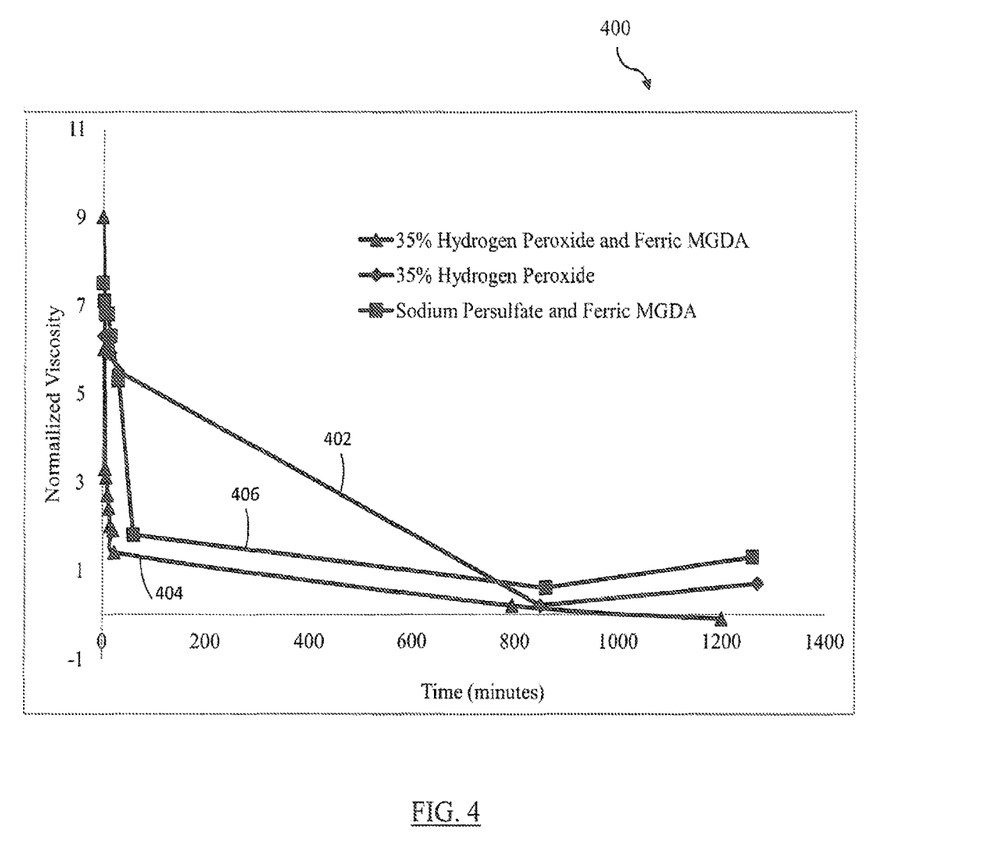
FIG. 4 is a plot showing the relative normalized fluid viscosities over time of three polyacrylamide viscosified fluid solution samples, where the first sample received a dose hydrogen peroxide, the second sample received a dose of hydrogen peroxide and ferric MGDA, and the third sample receive a dose of sodium persulfate and ferric MGDA.

Turning now FIG. 4, plot 400 shows the relative normalized fluid viscosities over time of three polyacrylamide viscosified fluid solution samples, where the first sample received a 5.0 mL dose of 35% by weight hydrogen peroxide, the second sample received a 0.25 mL dose of 35% by weight hydrogen peroxide and a 0.25 mL does of 20% by weight ferric MGDA, and the third sample receive a 600 mg dose of sodium persulfate and a 1 mL does of 20% by weight ferric MGDA.

In this example, three 500 mL viscosified fluid samples composed of 0.5% by volume polyacrylamide solution were made using aqueous 6% by weight NaCl brim solution. The first sample, corresponding to trend line 402, received a 5.0 mL dose of 35% by weight hydrogen peroxide. The second sample, corresponding to trend line 404, received a 0.25 mL dose of 35% by weight hydrogen peroxide and a 0.25 mL does of 20% by weight ferric MGDA. In sample two, the ferric MGDA solution was added to the viscosified fluid and mixed thoroughly followed by the hydrogen peroxide. The third sample, corresponding to trend line 406, receive a 600 mg dose of sodium persulfate and a 1 mL does of 20% by weight ferric MGDA. In sample three, ferric MGDA solution was added to the viscosified fluid and mixed thoroughly followed by the sodium persulfate.

As can be seen in trend line 402 on plot 400, the viscosity of the viscosified fluid in the first sample is reduced at much slower rate, relative to the samples corresponding to trend lines 404 and 404. That is to say that the sample including only an oxidizing agent and lacking a catalyzing and redox initiating agent, namely Fe-MGDA, exhibits a slower viscosity reduction than those samples containing a catalyzing and redox initiating agent, namely Fe-MGDA, according to the present invention. The sample that include both the hydrogen peroxide oxidizing agent and the Fe-MGDA catalyzing and redox initiating agent, identified by trend line 404, achieved a normalized viscosity approximately equal that of tap water, namely approximately 1.0, in approximately 100 minutes. This was the shortest time period for a reduction in velocity of the tested samples in plot 400. The sample that include both the sodium persulfate oxidizing agent and the Fe-MGDA catalyzing and redox initiating agent, identified by trend line 406, also achieved a normalized viscosity plateau in approximately 100 minutes, however its final reduction in normalized viscosity was not as low as seen in trend line 404. In general, the sodium persulfate breaking times, i.e., viscosity reduction times, can be expected to be similar or longer than that of hydrogen peroxide.

Example 3

Figure 5:
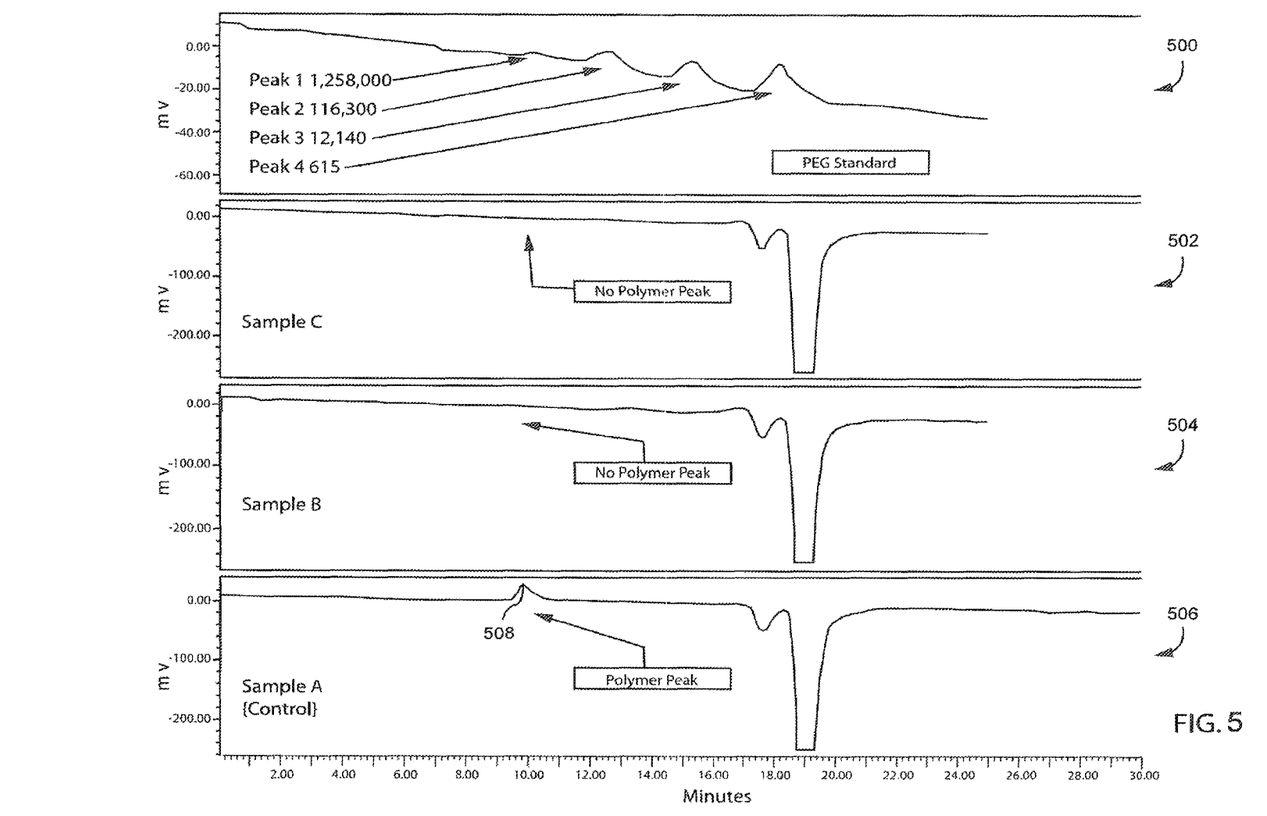
FIG. 5 is four chromatogram plots depicting the results of performing a gel permeable chromatograph analysis of a reference polyethylene glycol standard, a control polyacrylamide solution, a first treated polyacrylamide solution, and a second treated polyacrylamide solution, in accordance with one embodiment of the invention.

Referring now to FIG. 5, four chromatograms 500, 502, 504, and 506 are shown as the results of performing a gel permeable chromatograph (GPC) analysis of a reference polyethylene glycol standard shown in chromatograph 500, a control polyacrylamide solution identified as "Sample A (Control)" shown in chromatograph 506, a treated polyacrylamide solution identified as "Sample B" shown in chromatograph 504, and a treated polyacrylamide solution identified as "Sample C" shown in chromatograph 502.

FIG. 5 illustrates the change in molecular weight detected using a gel permeable chromatograph (GPC). In this example, a control polyacrylamide solution was created by diluting a polyacrylamide with tap water. Treatments B and C were conducted using a non inhibited Fe-MGDA catalyzed peroxide viscosity breaking composition applied to a viscosified fluid. A reference standard using polyethylene glycol was utilized to illustrate the molecular weight ranges of the polyacrylamide solutions. Units are measured in Daltons.

Unlike the peak 508, which is present in the a control polyacrylamide solution identified as "Sample A (Control)" shown in chromatograph 506, no corresponding peak appears in either the treated polyacrylamide solution identified as "Sample B" shown in chromatograph 504, or the treated polyacrylamide solution identified as "Sample C" shown in chromatograph 502.

Example 4

Figure 6:
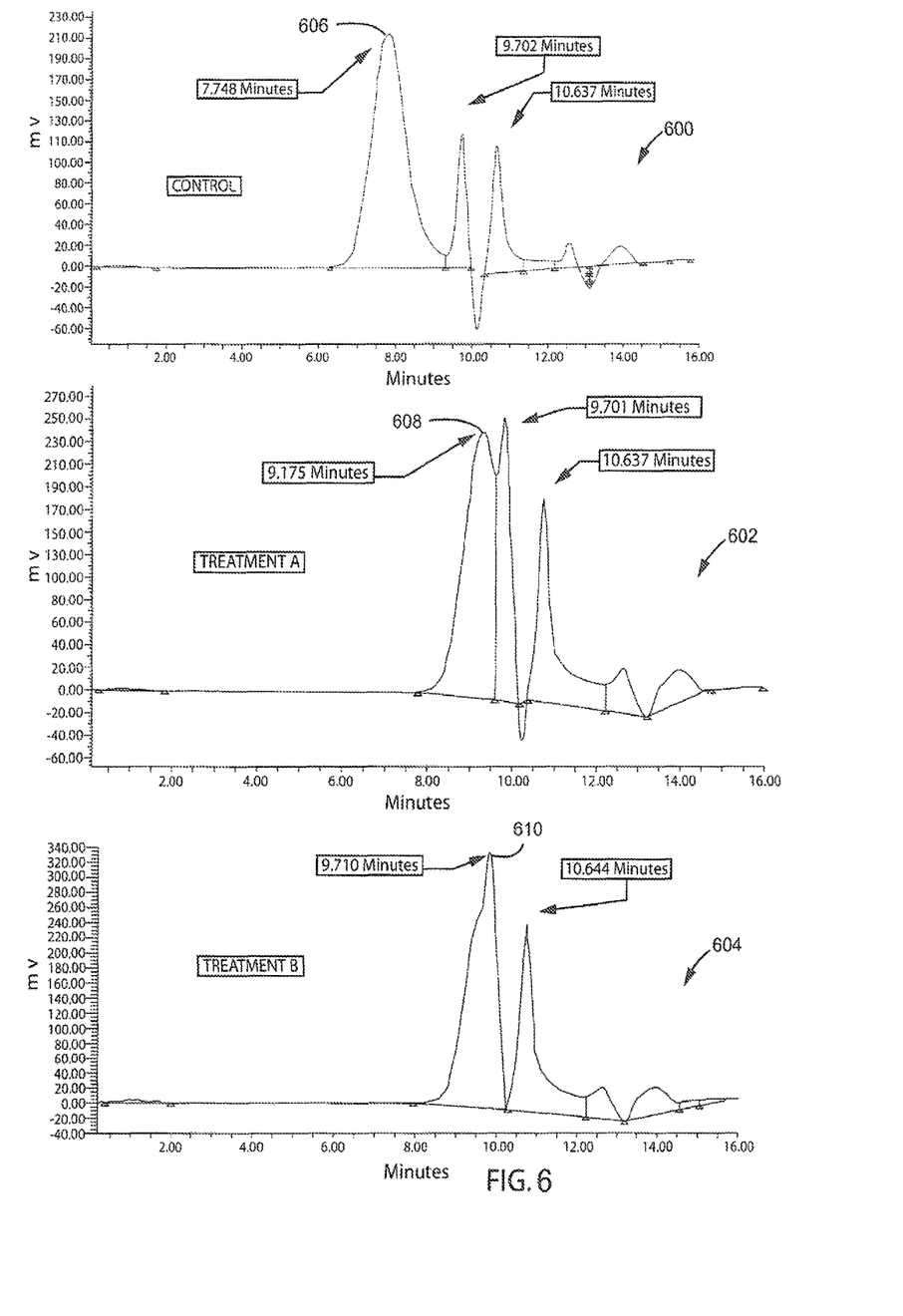
FIG. 6 is three chromatogram plots depicting the results of performing a gel permeable chromatograph analysis of a control polyacrylamide solution, a polyacrylamide solution identified as "treatment a", and a polyacrylamide solution identified as "treatment b," in accordance with one embodiment of the invention.

Referring now to FIG. 6, three chromatograms 600, 602, and 604 are shown as the results of performing a gel permeable chromatograph (GPC) analysis of a control polyacrylamide solution, a polyacrylamide solution identified as "Treatment A", and a polyacrylamide solution identified as "Treatment B".

FIG. 6 illustrates the change in molecular weight detected using a gel permeable chromatograph. In this example, a control polyacrylamide solution, identified as "CONTROL" and depicted in chromatogram 600 was created by diluting a polyacrylamide with tap water. Treatments A and B were conducted using a non-inhibited, Fe-MGDA catalyzed peroxide viscosity breaking composition applied to a viscosified fluid. The shift in the time of the primary polymer peak from 7.748 minutes, identified as peak 606 in control chromatograph 600, to 9.175 minutes in Treatment A, identified as peak 608 in control chromatograph 602, and 9.710 minutes in Treatment B, identified as peak 610 in control chromatograph 604, demonstrates a reduction in the molecular weight of the original polyacrylamide solution contained within the viscosified fluid, i.e., the "Control".

Example 5

The viscosity measurements of Table 4, below, illustrates viscosity reductions achieved using the uninhibited hydrogen peroxide oxidizing agent and the Fe-MGDA catalyzing and redox initiating agent in accordance with one embodiment of the present invention. In the listed solution, a volume of polyacrylamide was diluted using tap water to create three different viscosified solutions of varying viscosities. Each solution was then treated with a different dose of the Fe-MGDA catalyzing and redox initiating agent and the uninhibited hydrogen peroxide oxidizing component. Individual component concentrations can be manipulated in order to achieve a desired end viscosity value. This data supports the benefit/ability of activated peroxygen reaction to thoroughly reduce viscosity values. As demonstrated by the following table, concentrations of individual components, such as the uninhibited hydrogen peroxide oxidizing component and the Fe-MGDA catalyzing and redox initiating agent can be manipulated in order to achieve a desired final viscosity value.

TABLE 4

| Friction Reducer | Peroxide Component Dose (gal./1,000) | Activator (Fe-MGDA Catalyzing Agent) Dose (gal/1,000) | Beginning Viscosity (CPS) | Final Viscosity (CPS) |
|---|---|---|---|---|
| Polyacrylamide Based Gel Water | 0.25 | 0.25 | 779 | 4.56 |
| Polyacrylamide Based Gel Water | 0.5 | 0.5 | 779 | 3.78 |
| Polyacrylamide Based Gel Water | 1.0 | 1.0 | 779 | 4.2 |
| Polyacrylamide Based Gel Water | 2.0 | 2.0 | 779 | 7.6 |
| Polyacrylamide Based Gel Water | 3.0 | 3.0 | 779 | 3.84 |
| Polyacrylamide Based Gel Water | 4.0 | 4.0 | 779 | 4.26 |
| Polyacrylamide Based Gel Water | 0.063 | 0.063 | 70.2 | 5.82 |
| Polyacrylamide Based Gel Water | 0.125 | 0.125 | 70.2 | 4.32 |
| Polyacrylamide Based Gel Water | 0.25 | 0.25 | 70.2 | 3.72 |
| Polyacrylamide Based Gel Water | 0.5 | 0.5 | 70.2 | 3.72 |
| Polyacrylamide Based Gel Water | 0.75 | 0.75 | 70.2 | 3.60 |
| Polyacrylamide Based Gel Water | 1.0 | 1.0 | 70.2 | 3.96 |
| Polyacrylamide Based Gel Water | 1.5 | 1.5 | 70.2 | 3.42 |
| Polyacrylamide Based Slick Water | 0.25 | 0.25 | 7.00 | 3.78 |
| Polyacrylamide Based Slick Water | 0.5 | 0.5 | 7.00 | 3.78 |
| Polyacrylamide Based Slick Water | 1.0 | 1.0 | 7.00 | 3.60 |
| Polyacrylamide Based Slick Water | 2.0 | 2.0 | 7.00 | 3.78 |
| Polyacrylamide Based Slick Water | 3.0 | 3.0 | 7.00 | 3.48 |
| Polyacrylamide Based Slick Water | 4.0 | 4.0 | 7.00 | 3.45 |
| Polyacrylamide Based Slick Water | 0.0 | 0.0 | 7.00 | 7.00 |

It should be understood that the invention is not limited in its application to the details of construction and arrangements of the components and method steps set forth herein. The invention is capable of other embodiments and of being practiced or carried out in various ways by those skilled in the art. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of reducing viscosity of a viscosified fluid in an underground operation comprising the steps of:

(a) combining an uninhibited viscosified fluid with a ferric methylglycinediacetate solution to form a mixture having a pH of greater than 4.0 absent a pH buffer,
(b) introducing the mixture without an oxidizing agent additive through a well into an underground formation at high pressure to fracture the underground formation;
(c) after fracturing the underground formation, the feme methylglycinediacetate solution catalyzing a conversion of at least a portion of the uninhibited viscosified fluid in the mixture to a reduced viscosity fluid having a viscosity lower than the uninhibited viscosified fluid: and
(d) extracting the reduced viscosity fluid from the well.

2. The method of claim 1, wherein the step of converting at least a portion of the uninhibited viscosified fluid in the mixture to the reduced viscosity fluid further comprises:
reducing a molecular weight of one or more polymers contained in the viscosified fluid.

3. The method of claim 1, wherein the ferric methylglycinediacetate solution has a logarithmic stability constant value of between 20.0 and 15.0.

4. The method of claim 1, wherein the reduced viscosity fluid has a viscosity approximately equal to a viscosity of water.

5. The method of claim 1, further comprising the steps of:
adding a proppant material into the mixture; and
introducing the proppant material into fractures in the underground formation after the underground formation has been fractured.

6. A method of reducing viscosity of a viscosified fluid in an underground operation comprising the steps of:
(c) combining an uninhibited viscosified fluid with a ferric methylglycinediacetate solution to form a mixture,
(d) introducing the mixture through a well into a subsurface;
(c) after introducing the mixture into the subsurface, the ferric methylglycinediacetate solution catalyzing a conversion of at least a portion of the uninhibited viscosified fluid in the mixture to a reduced viscosity fluid having a viscosity lower than the uninhibited viscosified fluid: and
(d) extracting the reduced viscosity fluid from the well.

7. The method of claim 6, wherein the step of converting at least a portion of the viscosified fluid in the mixture to the reduced viscosity fluid further e-emprises consists of:
reducing a molecular weight of one or more polymers contained in the uninhibited viscosified fluid.

8. The method of claim 6, wherein the ferric methylglycinediacetate solution is provided in a solution having a pH of between 4.0 and 8.0.

9. The method of claim 6, wherein the ferric methylglycinediacetate solution has a logarithmic stability constant value of between 20.0 and 15.0.

10. The method of claim 6, wherein the reduced viscosity fluid has a viscosity approximately equal to a viscosity of water.

11. The method of claim 6, further consisting of the step of:
introducing the mixture through the well into an underground formation at high pressure to fracture the underground formation.

12. The method of claim 11, further consisting of the steps of:
adding a proppant material into the mixture; and
introducing the proppant material into a fracture in the underground formation after the underground formation has been fractured.

13. A method of reducing viscosity of a viscosified fluid in an underground operation comprising the steps of:
(a) combining an uninhibited viscosified fluid, a proppant material, and a ferric methylglycinediacetate solution to form a mixture having a pH of greater than 4.0 absent a pH buffer,
(b) introducing the mixture without an oxidizing agent additive through a well into an underground formation at high pressure to fracture the underground formation;
(c) after fracturing the underground formation, the ferric methylglycinediacetate solution catalyzing a conversion of at least a portion of the uninhibited viscosified fluid in the mixture to a reduced viscosity fluid having a viscosity lower than the uninhibited viscosified fluid: and
(d) extracting the reduced viscosity fluid from the well while the proppant material remains in the underground formation.

* * * * *